June 21, 1949   M. E. PORTER   2,474,190
THERMOSTATIC SWITCH
Filed May 2, 1947
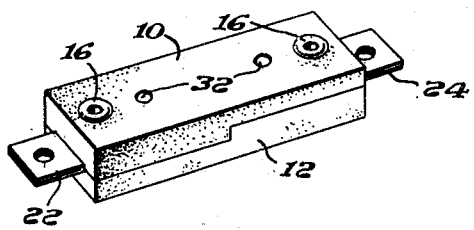
Fig. 1
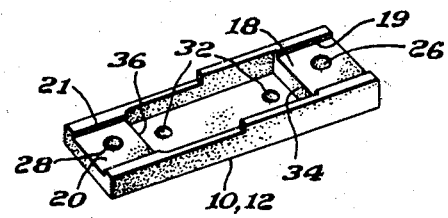
Fig. 2
Fig. 3
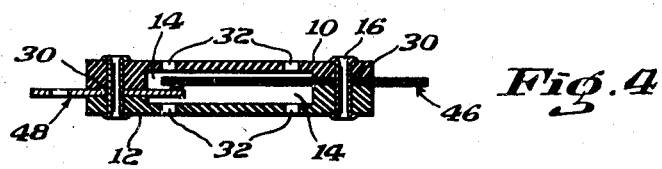
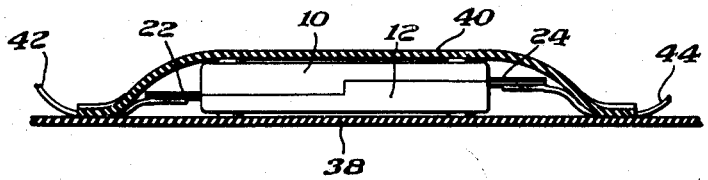
Fig. 4
Fig. 5
INVENTOR.
Malcolm E. Porter
BY John H. McKenna
ATTORNEY Patented June 21, 1949

2,474,190

UNITED STATES PATENT OFFICE 2,474,190

THERMOSTATIC SWITCH

Malcolm E. Porter, Middleboro, Mass., assignor to The Lobl Manufacturing Company, Middleboro, Mass., a corporation of Massachusetts Application May 2, 1947, Serial No. 745,599

5 Claims. (Cl. 200—139)

This invention relates to improvements in thermostatic control devices and more particularly to such devices which may be manufactured economically on principles of mass production in the small sizes suitable for embodiment in electric heating pads, electric blankets, and the like, for effective automatic control of the temperature of a pad or blanket or other electrical device or unit.

It is among the objects of the invention to provide a thermostatic control device having a minimum number of parts which may be produced economically in quantities on principles of mass production, and which economically may be assembled by unskilled labor.

A feature is that my improved thermostatic device consists of but six parts of which two may be identical stamped combined contact and terminal elements, and two may be identical halves of an insulating housing, while the other two parts may be identical rivets or other comparable means for securing the contact-terminal elements and the halves of the housing in assembled relation.

Another object is to provide a thermostatic control device having relatively few parts which may be easily and economically assembled and which readily may be accurately calibrated after assembly without need for any adjusting screws or the like projecting exteriorly of the housing or casing within which the thermally responsive elements of the device are enclosed.

A further object is to provide a thermostatic control device having an insulating housing enclosing the thermally responsive elements of the device, with means for getting access through the housing for setting the positions of the responsive elements in either of two opposite directions, thereby to accurately calibrate the device subsequent to its assembly.

Yet another object is to provide a thermostatic control device wherein a pair of strips coact to open and to close a circuit through the device, at least one of said strips being of a nature to continue in any shape to which it may be bent with little or no resilient tendency to return to its initial shape, whereby my improved device may be accurately and permanently calibrated by bending a said strip.

Still another object is to provide a relatively small thermostatic control device for electric heating pads, electric blankets, and the like, wherein an insulating housing encloses the responsive elements, with an access opening through the housing walls at opposite sides of each responsive element whereby a said element may be adjusted in either of two opposite directions through the said openings subsequent to assembly of the device, and there being flexible sheet material enclosing the insulating housing and covering said access openings and constituting also a means by which the device may be secured to a pad or blanket.

It is, moreover, my purpose and object generally to improve the structure and uniformity of thermostatic control devices.

In the accompanying drawing:

Fig. 1 is a perspective view of a thermostatic control device embodying features of my invention;

Fig. 2 is a medial longitudinal cross-sectional view of the device of Fig. 1;

Fig. 3 is a perspective view of one of the two identical halves of the insulating housing shown in Figs. 1 and 2;

Fig. 4 is a medial longitudinal cross-sectional view of a modified form of thermostatic control device; and Fig. 5 is a cross-sectional view of a wall of an electric pad with my improved thermostatic device, shown in elevation, secured thereto.

Referring to the drawing, two sections 10, 12 of an insulating housing fit together to define an interior generally rectangular chamber 14, and the sections preferably are permanently secured together by the rivets 16, one at each end of the housing. However, it will be readily understood that the housing sections may be secured together in any other conventional manner, either permanently or with provision for separating them to get free access to the interior of the sections.

The sections 10, 12 may be molded or otherwise formed of Bakelite or any other suitable insulating material, and it is a feature that the two sections 10, 12 may be identical. As best seen in Fig. 3, each section has a relatively thick pillow 18 at one end and a relatively thin pillow 20 at the opposite end, and each pillow has a shallow groove therein, at 19 and 21 respectively, for seating one of the two metallic conductor strips 22, 24. Also each section 10, 12 has one half of the extent of the side walls of chamber 14 of the same height as one pillow 18 and the other half of the extent of said side walls of the same height as the other pillow 20. Hence two of the sections may be assembled with the pillow 18 of one section opposite the pillow 20 of the other section and with the grooves 19, 21 in the pillows combining to provide a slot at each end of the housing through which the strips 22, 24 extend. Each pillow 18, 20 has a hole therethrough, at 26, 28 respectively, and each strip 22, 24 has a hole 30 therein, for registering with the pillow holes, so that the rivets 16 may secure the sections 10, 12 together and also secure the strips 22, 24 in the housing.

In the form of the invention as best seen in Fig. 2, the strips 22, 24 may be identical bi-metal strips, each having substantial extent into chamber 14 and each having substantial extent exteriorly of the housing. The portions of the strips within chamber 14 constitute the thermally responsive elements of the device and each has a contact 23 at its inner free end for coaction with a similar contact at the free inner end of the other strip portion. The exteriorly projecting portions of the strips constitute terminals by which the device may be connected in an electric circuit.

It is a feature of the invention that, after assembly of my improved thermostatic control device, it easily and accurately may be calibrated to effect a predetermined desired thermostatic control of an electrical device. To this end, the walls of the housing on opposite sides of the strips 22, 24 are provided with access openings or holes 32 through which the strips may be engaged by a suitable instrument to set the strips in proper calibrated relation to each other. In this connection it should be noted that the pillows 18, 20 at the opposite ends of the housing provide relatively sharp shoulders at 34, 36 over which the strips may be bent by pressing on the portion of a strip opposite one of the access holes. Pressure on the strip in one direction tends to bend the strip over a shoulder 34 to move its contact in direction away from the adjacent contact, while pressure on the strip in the opposite direction tends to bend the strip over the shoulder 36 to move its contact toward the adjacent contact. The strips are formed of material whereby they remain set approximately in any positions to which they may be bent, with no appreciable spring-back. Hence either or both strips may be bent as may be desired to properly calibrate the device for a particular control service, and the calibration remains accurate and uniform over long periods of use. Also, if desired, each of a number of the devices may be calibrated for the same service performance with assurance that all will function alike and without the considerable variations which occur in prior comparable thermostatic control devices made with supposedly uniform control characteristics.

When my improved thermostatic control devices are to be used for the automatic control of electric heating pads, electric blankets, and the like, it is a further feature that one of the devices conveniently may be enclosed between two flexible sheets which can effectively cover the access openings 32, and by at least one of which sheets the device may be mounted on the pad or blanket. In Fig. 5 one of my thermostatic devices is represented at 10, 12 enclosed between two sheets 38, 40 of which the sheet 38 may be a rubber, or rubberized fabric, wall of an electric heating pad, for example. The sheet 40 may be a smaller sheet of rubber or rubberized fabric vulcanized or otherwise secured to the sheet 38 all around the margin of the sheet 40 so that the thermostatic device is maintained between the sheets with its access holes 32 effectively covered against tampering and against entrance of dust or other foreign matter to the contacts 23. Also the sheets effectively moisture-proof the thermostatic device. As shown, a flexible conductor 42 is soldered or otherwise secured to the terminal 22 and leads out between the sheets for connection to a suitable circuit conductor, and a similar flexible conductor 44 is connected to the other terminal 24 and leads out between the sheets for connection to another circuit conductor.

In the form of the invention shown in Fig. 4, only one strip 46 is of bi-metal and the other strip 48 may be of brass or other metal having substantially uniform shape under all thermal conditions of use. In this case the bi-metal strip 46 may have greater extent in chamber 14 than the strip 48 so that it will have greater thermal response than the shorter strips of the previously described form. This is desirable because the strip 48 is substantially un-responsive to temperature conditions so far as circuit control is concerned. In other respects, the Fig. 4 modification may be the same as the Fig. 2 form, with the access holes 32 through which the strip 46 may be bent toward or from the relatively fixed strip 48, for calibration purposes.

From the foregoing description, in connection with the drawing, it will be apparent that I have provided a simple thermostatic control device whose parts are few and economical to make and to assemble and whose calibration may be easily and accurately effected after assembly by merely bending the responsive strips one way or the other by an instrument insertible through access holes on opposite sides of each thermally responsive strip. At least one of the strips is of a nature to bend and to remain in any bent shape with little or no resilient spring-back, whereby a calibration once accurately made continues uniform and unchanging.

I claim as my invention:

1. In a thermostatic control device, an insulating housing defining an interior chamber, a pair of contact elements in coacting relation within said chamber, at least one of said contact elements comprising a bi-metal strip movable toward and from the other contact element in response to temperature changes, there being an access opening through each of two opposite walls of said housing through one of which said bi-metal strip may be engaged and bent in direction towards the other strip and through the other of which said bi-metal strip may be engaged and bent in direction away from the other strip for calibrating the device, and a pair of terminals exteriorly of the housing and each in electrical connection with a different one of said strips.

2. In a thermostatic control device, a pair of identical housing sections of insulating material associated together and defining an interior chamber, each section having a relatively low integral pillow and a relatively high integral pillow, and the sections being associated with the low pillow of one section opposite the high pillow of the other section, a pair of contact elements each extending between a different pair of opposed pillows and projecting in said chamber into coacting relation with the other element, at least one of said contact elements being a bi-metal strip, and means providing access through the housing to opposite sides of at least one of said strips for bending a said strip in either of two opposite directions.

3. A thermostatic control device comprising a pair of contact elements at least one of which is a flexible element having a contact at one end thereof, an insulating housing enclosing said contact elements, and means providing access through said housing to opposite sides of said flexible element at a region therealong spaced a substantial distance from its said contact whereby said flexible contact element enclosed within the housing is engageable from the exterior of the housing for setting the said element toward and from the other element, and means engaging opposite sides of said flexible contact element at a region therealong spaced substantially further from its contact than is the said access means, said engaging means providing an abrupt shoulder at each side of the flexible element over which the flexible element is adapted to be bent during its said setting.

4. A thermostatic control device comprising a pair of identical housing sections defining an interior generally rectangular chamber, opposed integral pillows on the sections at opposite sides of said chamber, a pair of contact elements, each extending between the said opposed pillows at a different side of said chamber and each extending in general direction toward the other within the chamber with the inner end portions of said elements in over-lapping relation, said pillows providing a relatively abrupt shoulder at two opposite sides of each said contact element over which a said element may be bent in either of two opposite directions, and means providing access through the housing sections through which a said contact element may be engaged to bend it over a said pillow-shoulder for setting its adjustment relative to the other contact element.

5. A thermostatic control device comprising a pair of identical housing sections of insulating material, each section having a pillow at each of its opposite ends, and a generally rectangular recess between the pillows, and the sections being secured together with said pillows in opposed relation and with said recesses combining to provide a generally rectangular closed chamber within the housing, a pair of contact elements, each extending between opposed pillows at different ends of the housing, and said elements extending into over-lapping relation within said chamber, there being access holes through said housing sections at opposite sides of each contact member through which holes the contact elements may be engaged for calibrating the device, and flexible sheet material covering said access holes and enclosing said housing sections and constituting also a means for mounting the device in a control position.

MALCOLM E. PORTER.

REFERENCES CITED

The following references are of record in the file of this patent:

UNITED STATES PATENTS

| Number | Name | Date |
| --- | --- | --- |
| 847,555 | Craft | Mar. 19, 1907 |
| 1,408,168 | Buck | Feb. 22, 1922 |
| 1,758,177 | Skinner | May 13, 1930 |
| 1,779,149 | Tavender | Oct. 21, 1930 |
| 1,791,225 | Rankin | Feb. 3, 1931 |
| 2,246,309 | Lee | June 17, 1941 |
| 2,328,342 | Howard | Aug. 31, 1943 |